United States Patent [19]
Miller

[11] Patent Number: 5,766,299
[45] Date of Patent: Jun. 16, 1998

[54] MOLD FOR SHAPING GLASS

[76] Inventor: Ronald P. Miller, R.D. #8, Box 195B, Greensburg, Pa. 15601

[21] Appl. No.: 743,382

[22] Filed: Nov. 4, 1996

[51] Int. Cl.⁶ .................................................. C03B 9/34
[52] U.S. Cl. .................... 65/261; 65/265; 65/267; 65/355; 65/356; 65/361; 65/374.12; 249/80; 425/526
[58] Field of Search ............... 65/214, 261, 265, 65/267, 319, 348, 207, 231, 355, 356, 357, 359, 360, 361, 374.12, 374.1; 249/79, 80; 425/526

[56] References Cited

U.S. PATENT DOCUMENTS

| | | | |
|---|---|---|---|
| 1,789,471 | 1/1931 | McGovern | 65/356 |
| 3,137,560 | 6/1964 | Ketcham | 65/356 |
| 3,140,166 | 7/1964 | Litalien et al. | 65/356 |
| 3,224,860 | 12/1965 | Stinnes | 65/355 |
| 3,528,796 | 9/1970 | Trahan | 65/357 |
| 3,607,207 | 9/1971 | Dahms | 36/357 |
| 3,642,462 | 2/1972 | Thomas | 65/360 |
| 3,768,948 | 10/1973 | Horberg, Jr. et al. | 425/387 |
| 3,844,753 | 10/1974 | Huebner | 65/375 |
| 3,888,647 | 6/1975 | Breeden et al. | 65/29 |
| 4,009,017 | 2/1977 | Jones | 65/356 |
| 4,067,711 | 1/1978 | Jones | 65/319 |
| 4,070,174 | 1/1978 | Nebelung et al. | 65/356 |
| 4,082,527 | 4/1978 | Jones et al. | 65/356 |
| 4,940,480 | 7/1990 | Martinez-Soto et al. | 65/374.12 |

*Primary Examiner*—Steven P. Griffin
*Attorney, Agent, or Firm*—Kirk D. Houser; Eckert Seamans Cherin & Mellot, LLC

[57] ABSTRACT

A unitary mold member for shaping glass includes an inner surface which shapes molten glass blown thereagainst and an outer surface. A cavity within the unitary mold member is positioned between the inner and outer surfaces. The unitary mold member has passages at about the upper end thereof between the cavity and the surrounding atmosphere. The unitary mold member also has passages at about the lower end thereof between the cavity and the surrounding atmosphere.

7 Claims, 4 Drawing Sheets

5,766,299

MOLD FOR SHAPING GLASS

BACKGROUND OF THE INVENTION

1. Field of the Invention

This invention relates to molds and, more particularly, molds for shaping glass.

2. Background Information

The art of glass making is thousands of years old. Modern methods of forming glass containers, such as bottles, glasses and the like, include use of glass blowing machines that mass produce such containers. A well known type of glass blowing machine is the Hartford IS type machine. Such machines utilize a plurality of molds to form the containers. Typically, each mold consists of two sections that may be brought into juxtaposition to form a cavity into which a gob of glass can be blown to finished shape and that may be separated for removal of the blown piece from the mold cavity.

In operation, the mold sections are brought together in closed position; a gob of molten glass, or a glass container blank that is heated to a temperature at which the glass will readily flow, is delivered to the mold; compressed air is applied to blow the gob against the wall of the mold cavity and to form the container; and the mold sections are opened to allow the blown container to be removed from the mold cavity and transferred to the lehr.

Sufficient heat must be removed from the glass while it is in the mold to render the piece non-flowable and self-supporting when it is removed from the mold. The heat is removed by heat flow through the wall of the mold and dissipation into the surrounding atmosphere. Some molds have heat radiating fins formed in the outer surface, and air currents may be directed across the mold to increase the rate of heat transfer. In some molds, holes are drilled vertically in the walls to assist in heat transfer. The rate of heat transfer may limit the speed of the glass blowing machine, and, consequently, the output. Conversely, if the rate of heat transfer can be increased, the production speed can be increased within limits. Also, excessive mold temperatures due to slow heat dissipation may shorten the mold life.

The molds used with glass blowing machines are customarily constructed of aluminum-bronze alloys or cast iron. Aluminum-bronze alloys have high heat conductivity, and permit relatively rapid cooling of the glass within the mold. ccordingly, aluminum-bronze is a commonly used mold material. Aluminum-bronze, however, is a relatively soft material that is susceptible to damage and erosion. Also, it is relatively expensive.

Damage to the mold sections may occur from broken glass becoming wedged between the mold sections when they are closed or by mishandling. If the damage is not on the inner surface, or mold cavity, of the mold section, it can be repaired. Repairs are time consuming, however, and may require temporary replacement of the damaged mold and associated down time of the glass blowing machine. If damage occurs to the mold cavity of an aluminum-bronze mold section, a repair will leave a blemish which will mark pieces subsequently blown in the mold. The mold cavity of aluminum-bronze molds tend to erode through use and through cleaning. When that occurs, the desired size tolerances of the inner surface can be exceeded, rendering the mold useless. The susceptibility of aluminum-bronze molds to damage results in expense and in decreased production due to time spent in maintaining and replacing the molds.

Cast iron has also been used to make mold sections. Cast iron is more resistant to damage and erosion, but has a lower heat conductivity than does aluminumbronze. As a result, production rates are decreased because longer cooling times are required with cast iron molds than with aluminum-bronze molds. Cast iron is more difficult to repair than is aluminum-bronze. Cast iron mold sections are also more susceptible to fire cracking than aluminum-bronze molds. Fire cracking results from the repeated increase and decrease of the mold temperature during operation of the machine, and renders the mold unusable. These disadvantages also contribute to further production reductions from mold maintenance and replacement. Breeden et al. U.S. Pat. No. 3,888,647 shows a complex mold. A blank mold has an annular groove adjacent its upper end. A mold holder arm has a collar extending into the annular groove, and a cylindrical wall which surrounds and is spaced from a sleeve. The collar is removably bolted to the mold holder arm and the cylindrical wall by bolts. Air circulates from a passageway through a first chamber adjacent the outside of the blank mold to a second chamber adjacent the inside of the cylindrical wall. The sleeve separates the first and second chambers. A conduit extends through the cylindrical wall and connects the second chamber to a vacuum pump.

Horberg, Jr. et al. U.S. Pat. No. 3,768,948 discloses a mold for molding a thermoplastic resin. The mold includes an inlet for circulation of ethylene glycol or water.

Stinnes U.S. Pat. No. 3,224,860 shows a mold structure having external fins over which a cooling fluid is blown.

U.S. patent application Ser. No. 08/409,827 discloses a mold member comprising an outer shell and an inner insert which is spaced from the inner wall of the outer shell to form a cavity between the insert and the outer shell.

The disclosures of these references have not met desired standards with respect to ease of assembly of a mold for shaping glass in a glass blowing machine. None of the references discloses a unitary mold member for shaping glass.

SUMMARY OF THE INVENTION

The unitary mold member of the present invention comprises: an inner surface which shapes molten glass blown thereagainst; an outer surface; a cavity within the unitary mold member positioned between the inner and outer surfaces; at least one passage at about an upper end of the unitary mold member between the cavity and the surrounding atmosphere; and at least one passage at about a lower end of the unitary mold member between the cavity and the surrounding atmosphere.

The surrounding atmosphere will normally be ambient air which passes into the cavity through one of the passages and which passes out of the cavity through the other of the passages to remove heat from the inner surface of the unitary mold member.

As another aspect of the invention, a unitary mold member comprises: an inner surface which shapes molten glass blown thereagainst; an outer surface; a cavity within the unitary mold member positioned between the inner and outer surfaces; at least one internal surface within the unitary mold member positioned between the inner and outer surfaces and adjacent the cavity; at least one passage at about the upper end of the unitary mold member between the cavity and the surrounding atmosphere; and at least one passage at about the lower end of the unitary mold member between the cavity and the surrounding atmosphere.

Preferably, a plurality of first passages are provided at the upper end and a plurality of second passages are provided at the lower end of the unitary mold member.

The unitary mold member may include means for engaging a cooperating mold member to form a complete mold.

Preferably, the internal surface forms a wall with the inner surface, with the wall including heat conducting means in communication with the cavity for increasing the conduction of heat from the inner surface to the cavity. In a preferred embodiment, the heat conducting means includes a plurality of projections protruding into the cavity from the wall. Preferably, the wall is formed of a 431 type stainless steel and the projections are made of copper.

The internal surface may form a second wall with the outer surface of the unitary mold member. Preferably, the second wall is constructed of an aluminumbronze alloy.

As a further aspect of the invention, a mold member comprises: an inner surface which shapes molten glass blown thereagainst; an outer surface; a cavity within the mold member positioned between the inner and outer surfaces; at least one passage at about the upper end of the mold member between the cavity and the surrounding atmosphere; at least one passage at about the lower end of the mold member between the cavity and the surrounding atmosphere, with the surrounding atmosphere flowing through the passages and the cavity; and baffle means in juxtaposition to the upper end of the mold member at about the at least one passage at about the upper end, whereby the flow of the surrounding atmosphere is restricted.

The baffle means may have at least one passage which is smaller than the passage at about the upper end of the mold member, whereby the flow of the surrounding atmosphere through the cavity is restricted by the passage of the baffle means. The baffle means may include a baffle and means for removably securing the baffle to the upper end of the mold member.

Other details, advantages and features of this invention will become more apparent from the following description of the present preferred embodiment.

DESCRIPTION OF PREFERRED EMBODIMENTS

As employed herein, the terms "inner" and "outer" are defined with respect to glass to be shaped by a mold member, with the term "inner" referring to a portion of such mold member which is generally closer to the glass and with the term "outer" referring to a portion of the mold member which is generally farther from the glass.

As employed herein, the term "atmosphere" is intended to include, but shall not be limited to, the gaseous mass surrounding the earth; air, such as ambient air; a gas or combination of gasses in a conduit or enclosure which flow under the influence of a pressure gradient; or the gaseous environment surrounding a mold member.

Figure 1:
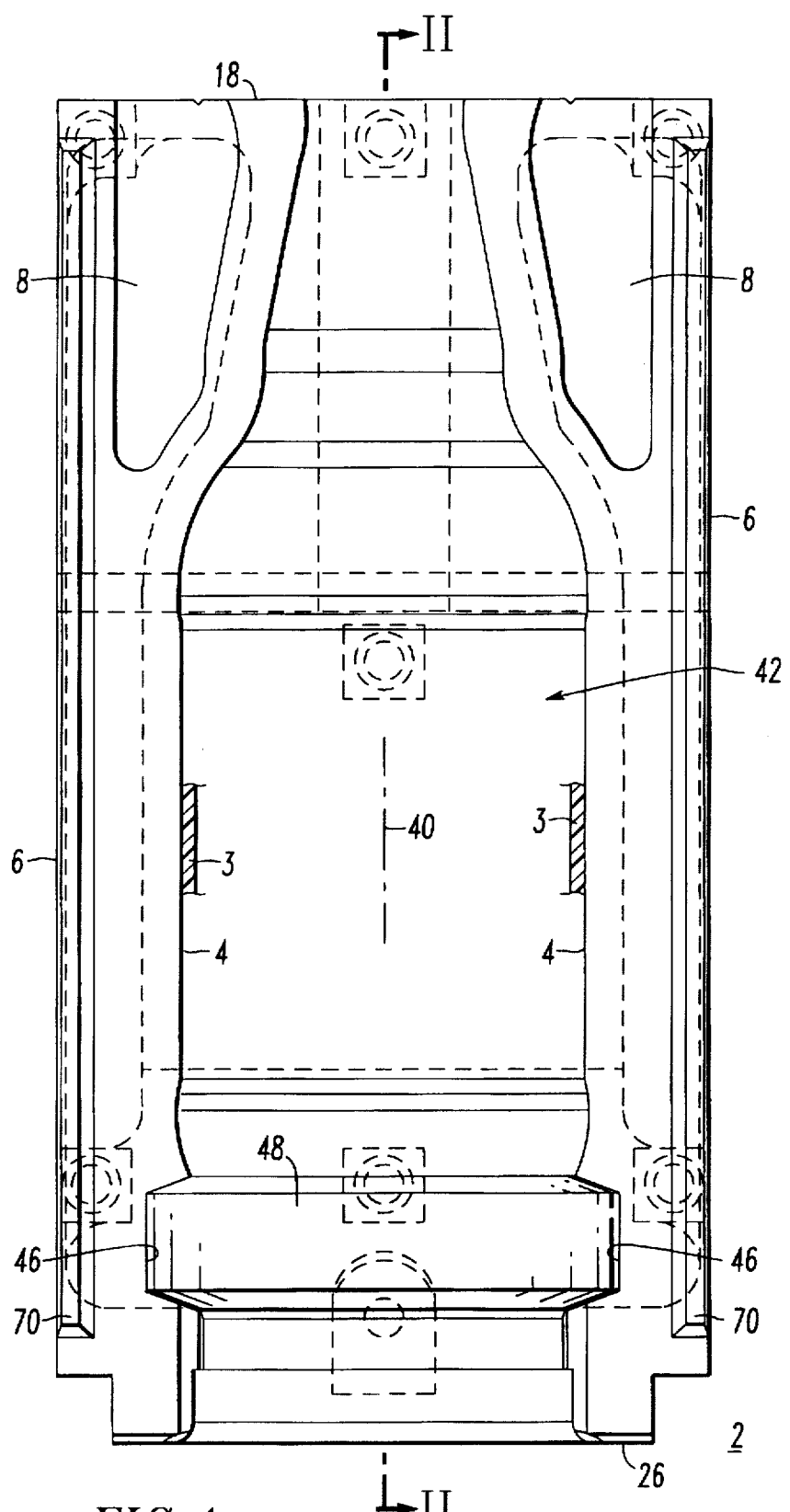
FIG. 1 is a front elevational view of a unitary mold member in accordance with the invention.

FIGS. 1–4 illustrate a present preferred embodiment of a unitary mold member 2 for shaping glass 3 (a portion of which is shown in FIG. 1) in accordance with the invention. The unitary mold member 2 includes an inner surface 4 which shapes molten glass 5 (FIG. 2) blown thereagainst, an outer surface 6, and a cavity 8 within the unitary mold member 2 positioned between the inner surface 4 and the outer surface 6. The unitary mold member 2 also includes one or more internal surfaces 10,12 (FIG. 2) within the unitary mold member 2 positioned between the inner surface 4 and the outer surface 6 and adjacent the cavity 8. The unitary mold member 2 further includes one or more passages 14,16 (FIG. 3) at about an upper end 18 of such member 2 between the cavity 8 and the surrounding atmosphere 20, and one or more passages 22,24 (FIG. 4) at about a lower end 26 of such member 2 between the cavity 8 and the surrounding atmosphere 20.

The outer surface 6 is fitted with a tab mechanism 27 (FIG. 2) to engage a glass blowing machine (not shown). The inner surface 4 forms a surface against which the molten glass 5 is blown during the glass blowing operation. A pair of the unitary mold members, including unitary mold member 2 and a similar mating unitary mold member 2' (shown in phantom line drawing in FIG. 2), are positioned in juxtaposition and cooperate to form a complete mold in which the cooperating inner surface (not shown) of the mating unitary mold member 2' forms a mold cavity in which a glass container (not shown) is formed.

Continuing to refer to FIGS. 1–4, the unitary mold member 2 is formed from an inner portion 28 and an outer portion 30. Inner portion 28 is positioned in juxtaposition with outer portion 30 in order that a major portion of surface 10 of inner portion 28 is spaced from surface 12 of outer portion 30, thereby forming the cavity 8 therebetween. Inner portion 28 also has a plurality of threaded holes 32 that are engaged by corresponding mechanical fasteners 34, such as machine bolts, of outer portion 30 in order to maintain outer portion 30 and inner portion 28 in a fixed unitary relationship with one another. The portions 28,30 are generally longitudinally coextensive with one another. However, any suitable alignment of the portions 28,30 may be used. In addition, while the exemplary embodiment utilizes two mold portions 28,30 to form the complete unitary mold member 2, it will be appreciated that a single mold portion may be structured to form a unitary mold member. For example, the two mold portions 28,30 may be part of a single casting or may be welded together to form a single unitary mold member.

The first internal surface 10 forms a first wall 36 with the inner surface 4. The second internal surface 12 forms a second wall 38 with the outer surface 6. A distance between the inner surface 4 and the first internal surface 10 is generally about constant for a major portion of the inner surface 4 which defines a central longitudinal axis 40.

Figure 2:
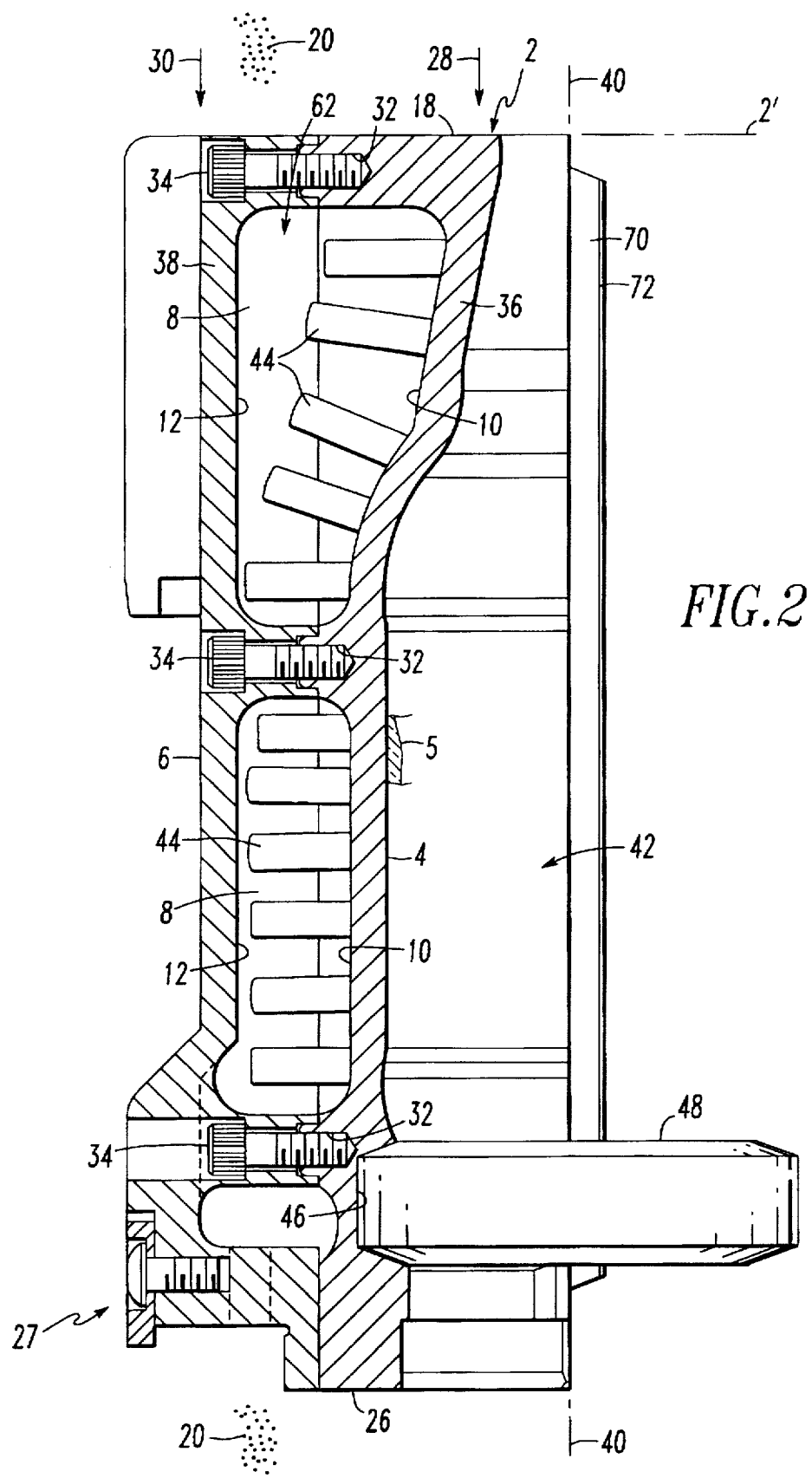
FIG. 2 is a sectional view of the unitary mold member of FIG. 1 taken through line II—II of FIG. 1.
Figure 3:
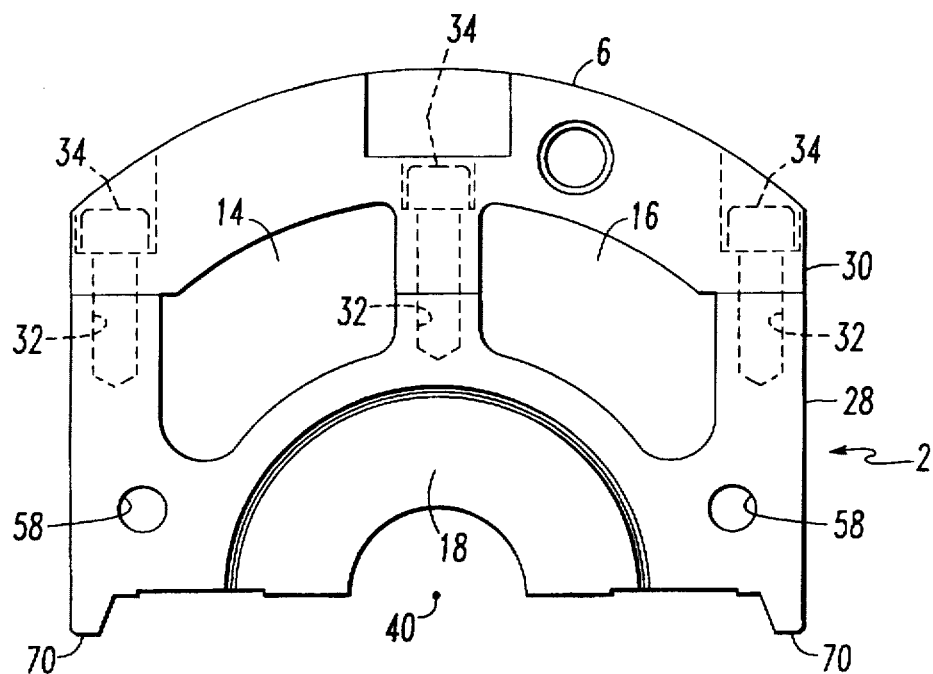
FIG. 3 is a top plan view of the unitary mold member of FIG. 1.

As best shown in FIG. 3, a plurality of upper passages 14,16 are formed between the portions 28,30 in the upper end 18 of the unitary mold member 2. Upper passages 14,16 are in communication with cavity 8 and with the surrounding atmosphere 20 of FIG. 2. The lower end 26 of the unitary mold member 2 is provided with a plurality of lower passages 22,24 (FIG. 4) in the respective portions 28,30. Lower passages 22,24 are also in communication with cavity 8 and with the surrounding atmosphere 20.

The surrounding atmosphere 20 of FIG. 2 includes ambient air which passes into the cavity 8 through the lower passages 22,24 and which passes out of the cavity 8 through the upper passages 14,16 to remove heat from the internal surface 10, the first wall 36 and, hence, the inner surface 4. The lower passages 22,24 are generally circular and are generally about equidistant from the central longitudinal axis 40. In this manner, in the preferred embodiment, air from the surrounding atmosphere 20 at the lower end 26 of the unitary mold member 2 flows through the passages 22,24 to the cavity 8; flows from the cavity 8 through the passages 14,16; and flows back to the surrounding atmosphere 20 at the upper end 18 of the unitary mold member 2.

As shown in FIG. 2, a plurality of projections 44 are welded onto internal surface 10 and protrude into cavity 8. Heat is conducted into the projections 44 from the internal surface 10 and radiates from the projections 44 which increase the conduction of heat from the internal surface 10 to cavity 8. These projections 44 provide additional surface area from which heat can be radiated and removed by the air passing through cavity 8, thereby reducing the time required to remove the heat from the cooling molten glass 5 and permitting more rapid solidification of the cooling solidified glass 3 of FIG. 1.

In a preferred embodiment, the first wall 36 is constructed of 431-type stainless steel, the second wall 38 is constructed of aluminum-bronze alloy, and the projections 44 are constructed of copper. The stainless steel provides better durability, including resistance to damage, fire cracking and wear, than does aluminum-bronze alloys or cast iron and, also, costs less than aluminum-bronze alloys. In addition, stainless steel is more easily repairable than are aluminum-bronze alloys or cast iron. The cross-sectional area of the exemplary stainless steel wall 36 of the unitary mold member 2 may be smaller than would be found in a mold member made entirely of stainless steel, thereby permitting more rapid conduction of heat therethrough than is obtainable with thicker cross sections. In addition, the air moving across a major portion of the internal surface 10 combined with the presence of projections 44 made of a relatively highly conductive material, such as copper, which has a heat conductivity that is greater than the heat conductivity of stainless steel, increases the removal of heat from the inner surface 4, thereby enabling more rapid cooling than can be achieved using conventional molds made of stainless steel. In addition, the conductivity of the aluminum-bronze wall 38 may further assist in increasing heat removal from the cooling glass container. Accordingly, this invention provides the durability and repairability of stainless steel molds along with the rapid cooling provided by conventional molds made of more conductive materials.

Although particular materials have been identified as preferred, it will be evident to those skilled in the art that other materials could be used. For example, the second wall 38 and outer portion 30 could be made of stainless steel and/or the first wall 36 and inner portion 28 could be made of cast iron.

As shown in FIGS. 1-2, the inner surface 4 is provided with a recessed portion 46. Recessed portion 46 engages or receives a bottom plate 48 of a type and in a manner known to those skilled in the art. The bottom plate 48 forms the portion of the unitary mold member 2 against which the bottom of the glass container is formed.

Figure 4:
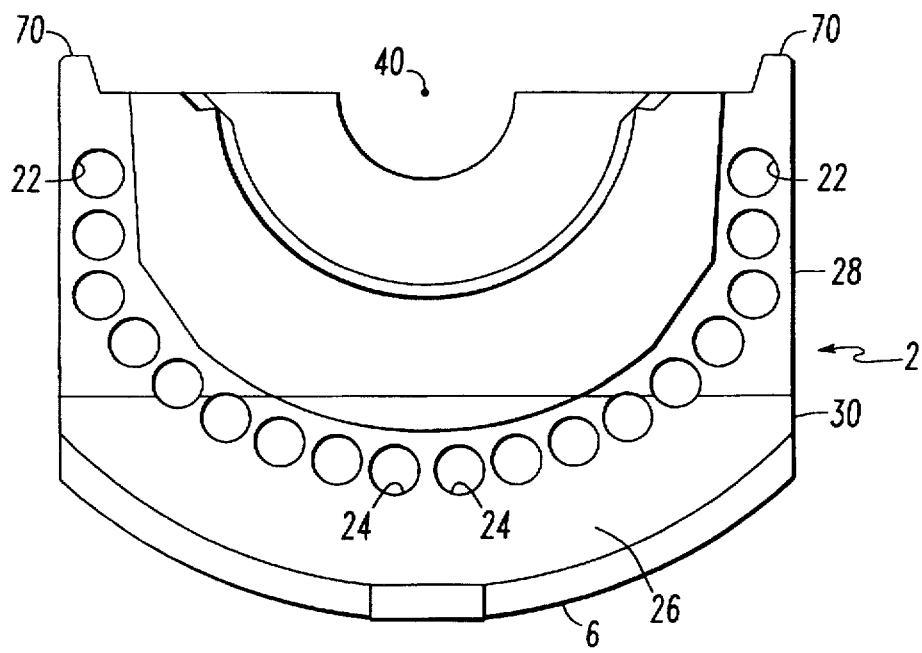
FIG. 4 is a bottom plan view of the unitary mold member of FIG. 1.
Figure 5:
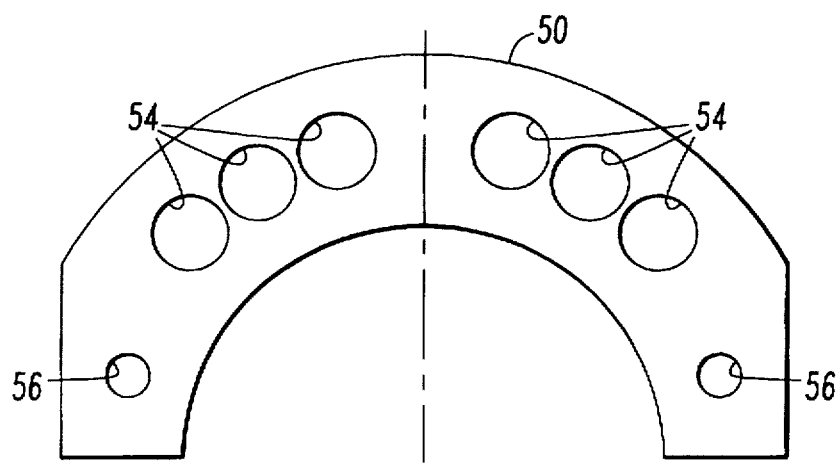
FIG. 5 is a top plan view of an air flow restriction baffle.
Figure 6:
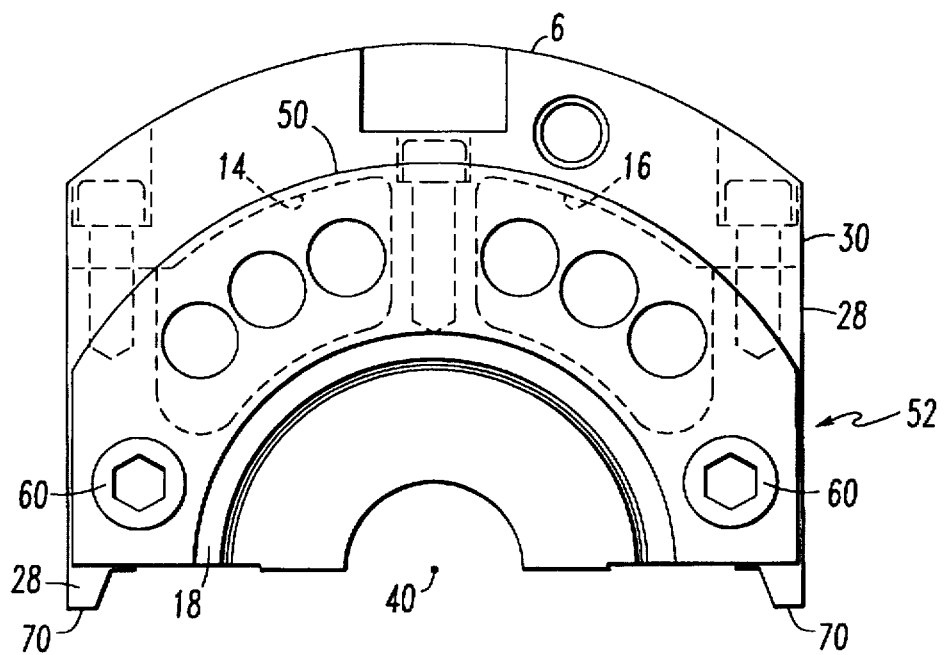
FIG. 6 is a top plan view of a mold member, similar to the unitary mold member of FIG. 1, including the air flow restriction baffle of FIG. 5.

Referring to FIGS. 5 and 6, a baffle 50 is positioned in juxtaposition to the upper end 18 of mold member 52 at about the passages 14,16 (shown in hidden line drawing) thereof. As shown in FIG. 5, the exemplary inverted-U-shaped baffle 50 has generally circular passages 54 which are smaller than the passages 14,16. In this manner, the flow of the surrounding atmosphere 20 through the cavity 8 of FIG. 2 is restricted by the passages 54. The baffle passages 54 are generally about equidistant from the central longitudinal axis 40 of the mold member 52. Preferably, a count (e.g., 6) of the passages 54 of the baffle 50 is less than a count (e.g., 18) of the passages 22,24 (FIG. 4) at the lower end of the mold member 52. The exemplary baffle 50 has three of the passages 54 for each one of the relatively larger passages 14,16 at the upper end 18 of the mold member 52.

It will be appreciated that many other types of baffles may be provided. For example, one or more baffles having zero, one or more passages may partially cover one or more passages of a mold member. Also, one or more baffles having zero passages, suitably spaced from the end of a mold member, may completely cover one or more passages of such mold member, with the spacing of the baffles from the end of the mold member suitably restricting the flow of the surrounding atmosphere.

Continuing to refer to FIGS. 5 and 6, the baffle 50 includes a pair of 5 holes 56 which corresponds to a pair of threaded holes 58 (as shown with the unitary mold member 2 of FIG. 3) at the upper end 18 of the mold member 52. The baffle 50 is secured to the inner portion 28 of the mold member 52 by a corresponding pair of mechanical fasteners 60, such as machine bolts. It will be appreciated that the baffle 50 is removably secured to the upper end 18 of the mold member 52 and, hence, may advantageously be replaced by another baffle (not shown) for suitably adjusting the air flow through the mold member 52. Except for the baffle 50 and the fasteners 60, the mold member 52 is similar to the unitary mold member 2 of FIGS. 1-4.

During the container forming operation, a molten glass gob, or a heated glass container blank, is introduced into the central cavity 42 (FIG. 2) defined by the inner surface 4 and the cooperating inner surface (not shown). The presence of the molten glass 5 elevates the temperature of the unitary mold member 2. Once the molten glass 5 is formed into the shape of a container, it must be cooled in order to solidify sufficiently for further handling. The heat of the molten glass 5 is conducted from the inner surface 4 to the first internal surface 10. Air, or a suitably inert gas, is introduced into the cavity 8 through lower passages 22,24 (FIG. 4). The air circulates through the air space of cavity 8 and exits through upper passages 14,16 (FIG. 3). The moving air assists in removing heat radiated from internal surface 10.

A pair of the unitary mold members 2 and 2' (FIG. 2) are positioned in a mold carrier (not shown) of a glass blowing machine (not shown) and cooperate to form a complete mold. When the complete mold is closed, the cavities 8 of the unitary mold members 2,2' will be in communication with one another to form a generally continuous cavity 62 surrounding the inner portions 28. Air may be delivered to the passages 22,24 (FIG. 4) in the lower end 26 of the unitary mold members 2,2' by any means known to those skilled in the art, such as, for example by an air source, by a fan and an air delivery conduit, or by natural convection. The bottom plate 48 (FIG. 2) is attached to the complete mold either before or after the closing thereof.

The unitary mold member 2 preferably includes a pair of tongues 70 (FIG. 3) each of which engages a corresponding one of a pair of grooves 72 (one groove 72 is shown in phantom line drawing in FIG. 2) in the cooperating unitary mold member 2' to form the complete mold. In addition, other exposed edges of the respective opposed mold members 2,2' may be provided with an indexing mechanism, such as tongues (not shown) and grooves (not shown), that maintain proper alignment of the complete mold when such mold members 2,2' are closed.

A gob of molten glass is charged into the closed complete mold. Compressed air is applied to the molten glass gob to force it to the inner surfaces 4 of respective mold members 2,2'. Air is introduced into the generally continuous cavity 62 to remove heat from the hot glass, as discussed above. When the glass is sufficiently solid, the complete mold is opened and the glass container is removed. The cycle is then repeated.

This invention provides a mold member for use in glass blowing machines that combines the durability and repairability of stainless steel with the superior heat removal characteristics of mold members made of materials having higher heat conductivity than stainless steel.

While certain presently preferred embodiments of this invention have been described and illustrated, it is to be appreciated that this invention is not limited thereto and that the invention may otherwise be variously practiced within the scope of the following claims.

I claim:

1. A mold member for shaping glass and positioned within a surrounding atmosphere, said mold member having an upper end and a lower end, and comprising:

an inner surface which shapes molten glass blown thereagainst;

an outer surface;

a cavity within said mold member positioned between said inner and outer surfaces;

at least one passage at about the upper end of said mold member between said cavity and the surrounding atmosphere;

at least one passage at about the lower end of said mold member between said cavity and the surrounding atmosphere, with the surrounding atmosphere flowing through said at least one passage at about the upper end of said mold member said cavity, and said at least one passage at about the lower end of said mold member; and baffle means in juxtaposition to the upper end of said mold member at about said at least one passage at about said upper end, whereby the flow of the surrounding atmosphere is restricted.

2. The mold member of claim 1, wherein said baffle means has at least one passage which is smaller than said at least one passage at about the upper end of said mold member, whereby the flow of the surrounding atmosphere through said cavity is restricted by said at least one passage of said baffle means.

3. The mold member of claim 2, wherein said at least one passage at about the lower end of said mold member is a plurality of passages; and a count of said at least one passage of said baffle means is less than a count of said passages at about the lower end of said mold member.

4. The mold member of claim 2, wherein said at least one passage of said baffle means is generally circular.

5. The mold member of claim 1; wherein said baffle means has a plurality of passages for each of said at least one passage at about the upper end of said mold member.

6. The mold member of claim 5, wherein said inner surface defines a central longitudinal axis; and said passages of said baffle means are generally about equidistant from the central longitudinal axis.

7. The mold member of claim 1, wherein said baffle means includes a baffle and means for removably securing the baffle to the upper end of said mold member.

* * * * *

UNITED STATES PATENT AND TRADEMARK OFFICE
CERTIFICATE OF CORRECTION

PATENT NO.   : 5,766,299
DATED        : June 16, 1998
INVENTOR(S)  : RONALD P. MILLER It is certified that error appears in the above-identified patent and that said Letters Patent is hereby corrected as shown below:

Column 1, line 45, "ccordingly" should be --Accordingly--.

Column 6, line 20, after "of" delete "5".

Signed and Sealed this

Eighth Day of June, 1999

Attest:

Q. TODD DICKINSON

Attesting Officer

Acting Commissioner of Patents and Trademarks